United States Patent [19]

Hager et al.

[11] 4,101,950
[45] Jul. 18, 1978

[54] PORTABLE FLUID TRANSFER PUMP

[75] Inventors: Donald L. Hager, Elmira; Ralph V. Brown, Cayuta; James A. Thomas, Corning, all of N.Y.

[73] Assignee: Facet Enterprises, Inc., Tulsa, Okla.

[21] Appl. No.: 739,402

[22] Filed: Nov. 8, 1976

[51] Int. Cl.² .................................................. H01H 47/32
[52] U.S. Cl. ..................................... 361/203; 417/417
[58] Field of Search ................ 331/112; 417/415, 417; 361/203

[56] References Cited

U.S. PATENT DOCUMENTS

| 2,806,432 | 9/1957 | Brooks | 417/417 |
| 3,381,616 | 5/1968 | Wertheimer et al. | 417/417 |
| 3,629,674 | 12/1971 | Brown | 417/415 |

FOREIGN PATENT DOCUMENTS

| 1,527,059 | 4/1967 | France | 417/417 |
| 422,076 | 1/1975 | U.S.S.R. | 331/112 |

Primary Examiner—Harry E. Moose, Jr.
Attorney, Agent, or Firm—Remy J. VanOphem

[57] ABSTRACT

A portable fluid transfer pump is disclosed herein. The pump comprises a small electromagnetically activated fluid pump embodying a highly reliable blocking oscillator cyclically activating a solenoid coil in the fluid pump, and an electrical power cord assembly including an electrical connector adapted to be received in a convenient source of electrical power. In the preferred embodiment, the electrical connector is a male connector adapted to be received in the cigarette lighter receptacle of a vehicle such as an automobile, recreational vehicle, truck, or boat.

16 Claims, 3 Drawing Figures

4,101,950

PORTABLE FLUID TRANSFER PUMP

BACKGROUND OF THE INVENTION

1. Field of the Invention

The field of the invention relates to electromagnetically actuated fluid pumps actuated by a blocking oscillator, and in particular to a portable fluid transfer pump.

2. Description of the Prior Art

The requirement for transferring fluid from one place to another at home as well as at remote locations such as a camp site, on a boat, a farmer in the field, and even in industrial facilities has been a common problem. Often it is inconvenient to dump or bail the fluid from one container to another and a small portable electrical pump could do the job more efficiently and expediently. Many of these applications are not sufficiently repetitive to justify the costs of building a pump into one or the other device to perform this function. Therefore, a small portable electrical fluid pump would find wide use for a variety of applications. However, to be useful, the pump must be sufficiently small so that it can be transported and stored with ease and readily be connected to a convenient source of electrical power. One convenient source of electrical power that is readily available, even at remote locations, is a battery such as that of an automobile, truck, tractor, recreational vehicle, off road vehicles, boat and even an aircraft. These vehicles normally have a cigarette lighter or other outlet which provides convenient access to the vehicle's source of electrical power. An electromechanical fluid pump having an electrical connector which could be plugged into the cigarette lighter or any other convenient electrical power outlet of a vehicle would fill many existing needs.

The portable fluid pump disclosed herein is of the type disclosed in my prior U.S. Pat No. 3,629,674 (December, 1971) and by H. P. Wertheimer et al. in U.S. Pat. No. 3,381,616 (May, 1968) which contains an improved, more reliable blocking oscillator and includes a cable, having an electrical connector receivable in a convenient electrical DC outlet of a vehicle.

SUMMARY OF THE INVENTION

The invention is a small portable fluid transfer pump adapted for use in remote locations utilizing the electrical power supply of an available vehicle. The portable transfer pump comprises a small electromagnetic pump having a reciprocating piston member actuated by a solenoid coil. The pump further includes a detection coil, magnetically linked to the solenoid coil which generates a signal in response to a change in the magnetic field generated by the solenoid coil. A blocking oscillator embodying a silicon Darlington amplifier cyclically controls the current flow through the solenoid coil activating a reciprocating piston member. Electrical power is supplied to the pump and blocking oscillator via a power cord which embodies a connector adapted to be received in an electrical power outlet of a vehicle or other convenient source of DC power. The silicon Darlington amplifier used in the blocking oscillator is less costly and more compact than equivalent germanium type solid state switching devices. The Darlington configuration provides high gain and permits the use of a higher base resistance which gives the blocking oscillator an operating temperature range from −55° C to +90° C without temperature compensation. The silicon Darlington amplifier also can endure higher temperatures and, therefore, minimizes the heat sink requirements permitting an even more compact pump assembly.

DETAILED DESCRIPTION OF THE PREFERRED EMBODIMENT

Figure 1:
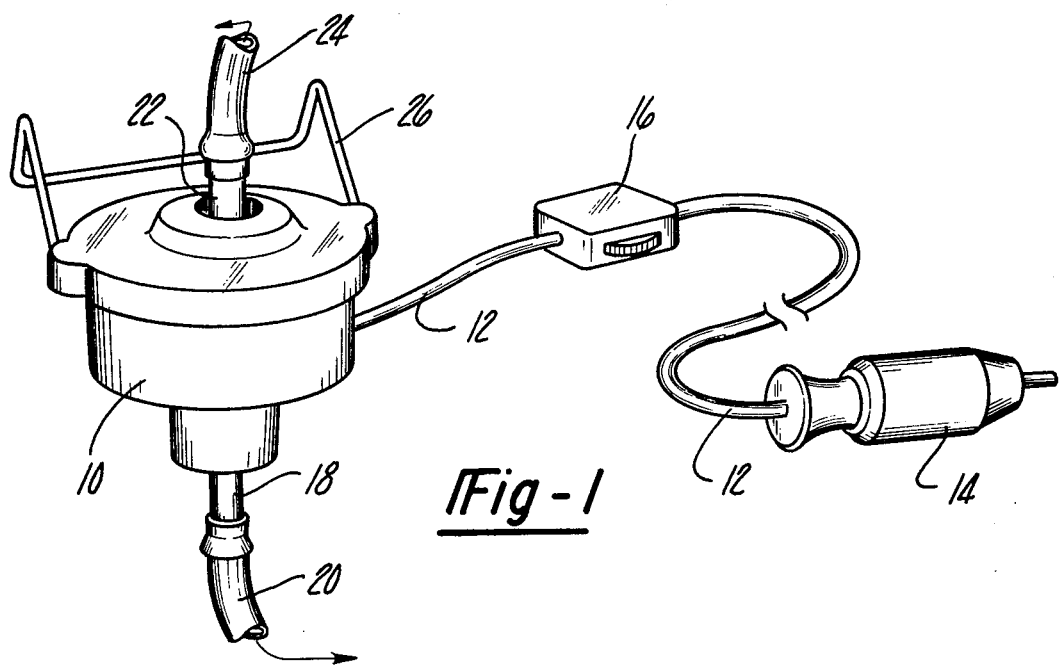
FIG. 1 is an illustration of a preferred embodiment of the portable fluid transfer pump system.
Figure 2:
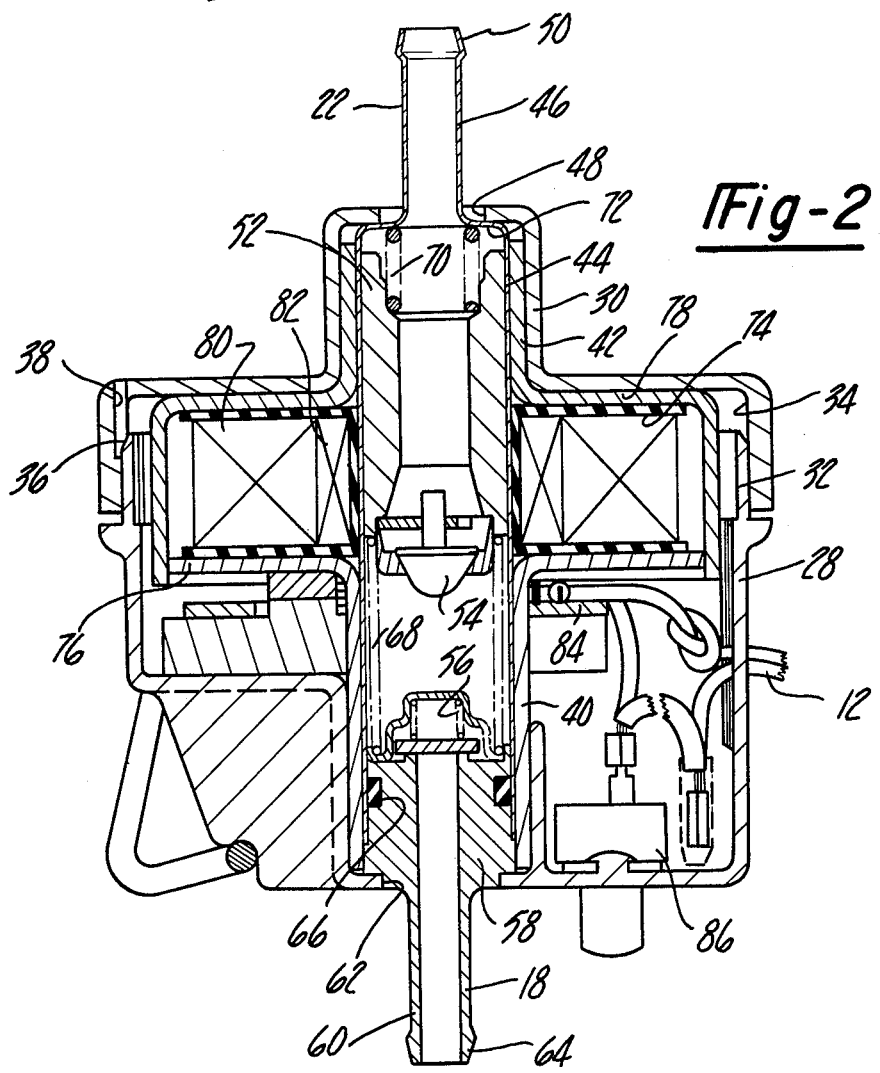
FIG. 2 is a cross sectional view of the electromagnetic fluid pump.

The preferred embodiment of the portable fluid transfer pump as illustrated in FIG. 1 comprises an electromagnetic pump 10 including an electronic blocking oscillator, an electrical cord 12 connected at one end to the electrical input of the electromagnetic pump, and at the other end to an electrical connector 14 adapted to be received into the cigarette lighter of a motor vehicle. An electrical switch 16 controlling the application of electrical power to the pump may be disposed along the cord 12 intermediate the electromagnetic pump 10 and the connector 14 or may be mounted on the body of the pump 10 as illustrated in FIG. 2. The pump 10 has an inlet 18 to which is connected a fluid conduit such as a rubber hose 20 which connects the pump with a source of fluid (not shown). The pump also has an outlet 22 to which is connected a second fluid conduit, such as a rubber hose 24, which transfers the pumped fluid to a desired repository (not shown). For example, the fluid transfer pump may transfer gasoline from a storage vessel or even the gasoline tank of a vehicle to the gasoline tank of an internal combustion engine powering a chain saw or vice versa. The pump also includes a hanger 26 which permits the pump to be suspended from any convenient support while in operation, and may also be used for storage.

The details of the electromagnetic pump 10 are illustrated in FIG. 2. The external housing of the pump comprises a body 28 and a cover 30. The upper portion of the body has a recessed circumferential land 32 generally mating with the inner surface 34 of the cover 30. A plurality of dogs 36 disposed at predetermined locations about the periphery of the land 32 engage a like plurality of detents 38 in the cover 30 and secure the cover 30 to the body 28. Guide supports 40 and 42 are disposed inside the body 28 and cover 30, respectively, and support a generally cylindrical guide 44. The upper end of the cylindrical guide 44 has a necked down portion 46 which comprises the outlet 22 shown on FIG. 1. The necked down portion 46 protrudes through an aperture 48 in the cover 30. The end of the necked down portion 46 has a truncated cone shaped portion 50 formed therein. The base of the truncated cone portion is slightly larger than the necked down portion 46. The end of the truncated cone portion 50 facilitates in attaching the rubber tube 24 and the larger base engages the inner wall of the rubber tube causing it to expand, thereby forming a fluid tight seal. Dispose in the cylindrical guide 44 is a magnetically permeable hollow piston member 52 which is free to move with a reciprocating motion within cylindrical guide 44. Valve members 54 and 56 provide an unidirectional fluid flow through the hollow piston from inlet 18 to outlet 22.

At the lower end of cylindrical guide 44 is disposed an input member 58 having a necked down portion 60 protruding through an aperture 62 in the body 28. The necked down portion 60 comprises the inlet 18 shown on FIG. 1 and also at its end has a truncated cone section 64 for receiving and forming a fluid seal with the rubber tubing 20 as described above. A seal, shown as O ring 66 forms a fluid seal between the inlet member 58 and the cylindrical guide 44. A first resilient member, such as spring 68 is disposed between the inlet member 58 and the piston member 52 an biases the piston member towards outlet 22. A second resilient member shown as spring 70 is disposed between the piston member 52 and a collar 72 formed in the cylindrical guide 44 at the base of the necked down portion 46. Spring 70 cushions the upward thrust of the piston member 52 under the urging of spring 68 at the end of the piston's stroke. Disposed on a spool 74 confined between the flanges 76 and 78 of the guide support members 40 and 42, respectively, are a solenoid coil 80 and a detection coil 82.

Electrical power is received by means of a two-wire electrical cord 12 through an aperature (not shown) in the body 28. One of the wires is connected directly to a printed circuit board 84 containing a blocking oscillator circuit, to be later described with reference to FIG. 3. The other wire is also connected to the printed circuit board 84 through a switch 86 which controls the on-off operation of the pump. As previously discussed relative to FIG. 1, the switch 86 may be admitted from the pump and inserted on the cord 12.

The operation of the pump is as follows: With no electrical power applied, the piston member 52 is in the uppermost position under the biasing face of spring 68 as shown. Closing switch 86 applies electrical power to the solenoid coil and the blocking oscillator on circuit board 84 which initiates a start current flow in solenoid coil 80. Solenoid coil 80 generates a magnetic field in response to the current flow and the detection coil 82 generates a signal initiating the operational cycle of the blocking oscillator which increases the current flow in the solenoid coil. The current flow in the solenoid coil rapidly increases until the generated magnetic field is sufficient to move the piston member against the biasing force of spring member 68. As the piston member moves against the force of spring member 68, valve 54 opens and valve 56 closes and the fluid trapped between the two valves is displaced into the hollow portion of the piston member as the piston moves toward valve 56. Saturation of the current flow in the solenoid coil 80 terminates the signal induced in the detection coil 82, terminating the current flow through transistors 98 and 100 (FIG. 3) terminating the current flow in the solenoid coil 80. The magnetic field generated by the solenoid coil collapses and is no longer capable of holding the piston member against the biasing force of spring 68. The piston member 52 then starts to move toward the outlet 22 under the force of spring 68. Valve member 54 closes and the fluid displaced into the hollow portion is carried with the piston member towards the outlet. Valve 56 opens and fluid from the source is drawn up through inlet 18 into the space between valves 54 and 56. When the magnetic field has completely collapsed, the pump is in its initial state and the cycle is repeated.

Figure 3:
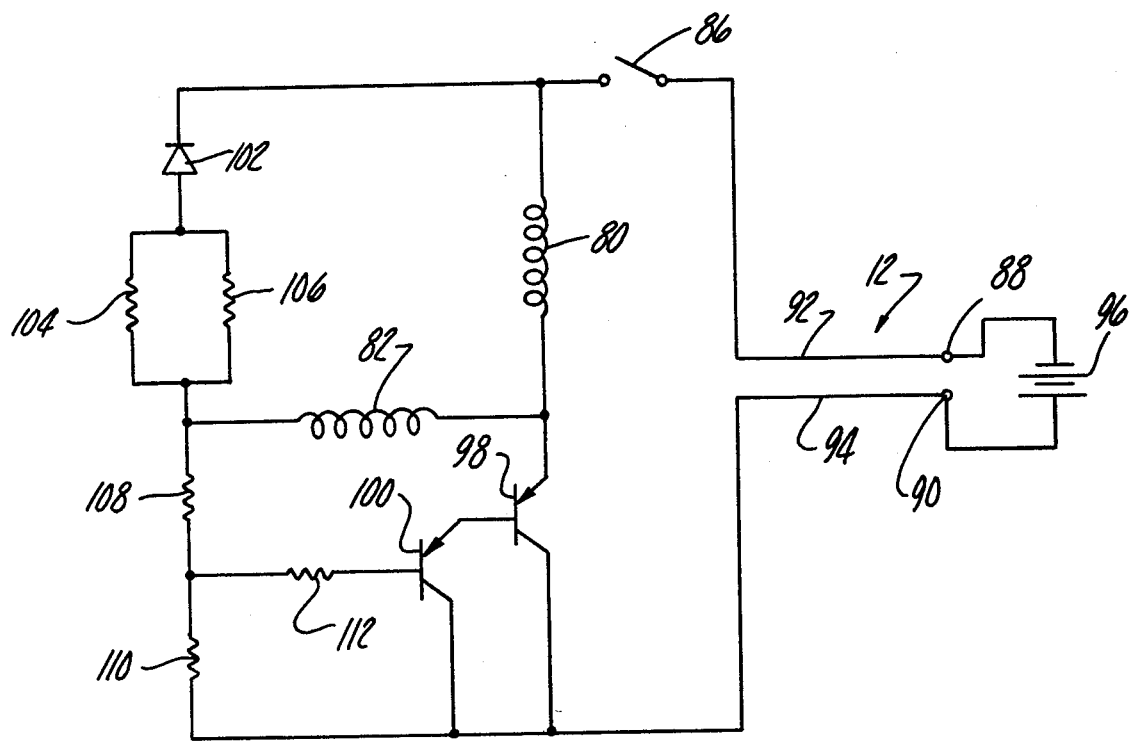
FIG. 3 is a circuit diagram of the blocking oscillator.

The details of the blocking oscillator disposed on circuit board 84 are shown on FIG. 3. Terminals 88 and 90 represent the contacts of the connector 14 at the end of electrical cord 12 represented by twin leads 92 and 94. Terminals 88 and 90 also connect to a source of electrical power illustrated as battery 96. Lead 92 connects to the input end of the solenoid coil 80 and the cathode of diode 102 through switch 86 while lead 94 connects to the collectors of transistors 98 and 100. Transistors 98 and 100 are connected to form the familiar pnp Darlington amplifier. The emitter of transistor 98 is the emitter terminal of the Darlington amplifier, the base of transistor 100 is the base terminal, and the collectors of transistors 98 and 100 are connected to the output end of solenoid coil 80 and to one end of detection coil 82. The other end of detection coil 82 is connected to the anode of diode 102 through parallel connected resistances 104 and 106 and to the base of transistor 100 through series connected resistances 108 and 112. The junction between resistances 108 and 112 is connected to the collectors of transistors 98 and 100 and to lead 94 through resistance 110.

The operation of the blocking oscillator is as follows: When switch 86 is closed, a start current flows through solenoid coil 80, detection coil 82, resistance 108, resistance 110 and lead 94 to terminal 90. Resistances 108 and 110 form a voltage divider applying a potential to the base of transistor 100, which is less than the potential at the emitter, thereby biasing transistor 100 and causing it to conduct. Conduction of transistor 100 forward biases transistor 98 causing it to conduct also. The conduction of transistors 98 and 100 increases the current flow through the solenoid coil 80. An increasing current flow in the solenoid coil generates an expanding magnetic field which induces a current to flow in the detection coil which is counter to the "start current " flow. The induced current forward biases the base of transistor still further increasing the conductance of transistors 98 and 100. This process continues and rapidly both transistors become saturated (fully conductive). In the meantime, the magnetic field generated by the solenoid coil 80 has become sufficient to retract the piston member 52 against the biasing force of spring 68. When transistors 98 and 100 start to saturate the magnetic field generated by the solenoid coil 80 expands at a slower rate and the signal induced in detection coil 82 decreases. A decrease in the signal induced in the detection coil decreases the current, forward biasing the base of transistors 98 and 100. This process continues until the base current of transistor 100 is terminated, turning off transistor 98 and the current flow through solenoid coil 80. Termination of the current flow in solenoid coil 80 causes the magnetic field to collapse (contract) inducing a signal in the detection coil 82 which is in the reverse direction of the signal induced by the expanding magnetic field and back biases transistor 100 holding transistors 98 and 100 in the off (nonconductive) state until the magnetic field has completely collapsed. After the magnetic field has collapsed, the signal induced in the detection coil 82 back biasing transistor 100 in the "off" state is terminated and the "start current" again will start to flow through the solenoid coil 80, detection coil 82 and resistances 108 and 110 forward biasing transistor 100 reinitiating the cycle.

The circuit comprising resistances 104 and 106 and diode 102 provides a controlled dissipation of the current induced in the solenoid and detection coils when the transistors 98 and 100 are in the "off state" and the magnetic field is collapsing.

The high gain Darlington amplifier comprising transistors 98 and 100 permits the use of smaller control signals permitting an increase in the valve of the base resistance 110. This increases the stability of the oscillator over a wider range of temperatures, and increases the life of the oscillator since the current induced by the collapsing magnetic field will preferentially flow through the dissipation circuit comprising resistances 104 and 106 and diode 102. The silicon Darlington amplifier is also more compact than equivalent germanium devices and can endure higher temperatures, eliminating the requirement for an elaborate heat sink to dissipate the heat generated.

Typical values for the components of the circuits illustrated in FIG. 3 are as follows:
  Diode 102 — 2 amperes, 200 volts
  Resistance 104 — 180 ohms, ½ watts
  Resistance 106 — 180 ohms, ½ watts
  Resistance 108 — 10 ohms, ¼ watts
  Resistance 110 — 2000 ohms, ¼ watts
  Resistance 112 — 130 ohms, ¼ watts Having described the preferred embodiment with reference to the Figures, it is not intended that the invention be limited to the specific embodiment shown. One skilled in the art could alter the pump or circuit configuration without deterring from the spirit of the invention.

What is claimed is:

1. A portable fluid transfer pump comprising:
a cylindrical member having a guide portion at one end and a contiguous necked down portion at the other end, said necked down portion forming an outlet port;
solenoid coil means disposed concentrically about the outside of said guide portion for generating a magnetic field in response to a current flow;
detection coil means magnetically linked to said solenoid means for generating a first signal in response to said solenoid coil means generating an increasing magnetic field, and for generating a second signal in response to said solenoid coil generating a decreasing magnetic field;
resiliently biased piston means disposed in said guide portion adjacent to said solenoid coil means, said piston means reciprocally movable against said bias in response to the magnetic field generated by said solenoid coil means;
an inlet member having one end received in the end of said cylindrical member's guide portion opposite said necked down portion, said inlet member having a like necked down portion extending outwardly from said cylindrical member, and a fluid passageway passing through said inlet member concentric with said like necked down portion, said fluid passageway forming an inlet port;
valve means disposed in said cylindrical member for providing a unidirectional fluid flow from said inlet port to said outlet port;
an external housing enclosing said inlet member, said cylindrical member, said solenoid coil and said detection coil, said housing comprising an upper member having an aperture receiving therethrough the necked down portion of said cylindrical member, a lower member having an aperture therethrough the like necked down portion of said inlet member, and means for locking said upper member to said lower member, said upper and lower members in their locked state securing said inlet member in said cylindrical member; and
a blocking oscillator having an electronic switch member for controlling the current flow through said solenoid coil in response to said first and said second signals generated by said detection coil.

2. The portable transfer pump of claim 1 wherein said blocking oscillator comprises a solid state switch having an emitter terminal connected to the output end of said solenoid coil and to one end of said detection coil, a collector terminal connected to the other of said two electrical leads, and a base;
a series connected first and second resistance connecting the other end of said detection coil to said collector terminal, said first and second resistance forming in combination with said solenoid coil and said detection coil, a voltage divider between said one lead and said other lead;
a third resistance having one end connected to the junction between said first and second resistance and the other end connected to the base terminal of said solid state switch; and
a series connected resistance and diode connected between the other end of said detection coil and the input terminal of said solenoid coil, in parallel circuit relationship with said solenoid and detection coils dissipating in a controlled manner the current induced in said solenoid and detection coils by a rapidly contracting magnetic field;
wherein said first signal induced in said detection coil forward biases the base terminal of said solid state switch increasing the current flow through said solenoid coil, and said second signal back biases the base terminal of said solid state switch decreasing the current flow through said solenoid coil.

3. The portable fluid transfer pump of claim 2 wherein said solid state switch is a silicon Darlington amplifier.

4. The portable fluid transfer pump of claim 3 wherein the resistance of said serially connected resistance and diode comprises a fourth resistance connected in parallel circuit relationship with a fifth resistance between the other end of said detection coil and said diode .

5. The portable fluid transfer pump of claim 3 wherein said housing further includes an isolated internal chamber, said blocking oscillator being disposed in said isolated internal chamber.

6. The portable fluid transfer pump of claim 5 wherein said fluid pump further includes an electrical cord having at least two electrical leads for providing electrical power to said pump, one end of said electrical cord is attached to said pump and the opposite end is connected to an electrical connector adapted to be received in an electrical outlet of a convenient source of electrical power.

7. The portable transfer pump of claim 6 wherein said connector is adapted to receive electrical power from a cigarette lighter receptacle of a motor vehicle.

8. The portable fluid transfer pump of claim 5 wherein said electrical cord further includes a switch for controlling the flow of electrical power from said connector to said solenoid coil.

9. The portable transfer pump of claim 8 wherein said connector is adapted to receive electrical power from a cigarette lighter receptacle of a motor vehicle.

10. The fluid transfer pump of claim 3 wherein said pump further includes a hanger for hanging said pump from a convenient support.

11. A portable fluid transfer pump comprising:
a housing having coaxially disposed apertures and an internal surface;
a cylindrical guide member disposed in said housing coaxial with said apertures, said guide member having a contiguous necked down section at one end passing through one of said apertures and forming an outlet port;

an inlet member received in the other end of said guide member, said inlet member having a like necked down section coaxial with said guide member and a coaxial fluid passageway passing therethrough, said like necked down section passing through the other of said apertures and forming an inlet port, the unnecked down sections of said inlet member and said guide member abutting the internal surface of said housing adjacent to said apertures;

a cylindrical armature slideably disposed in said guide member, said guide member having a central bore forming a valve retainer;

first valve means fixedly disposed in said valve retainer for providing a unidirectional fluid flow through said cylindrical armature towards said outlet port, said first valve means having a portion protruding from said armature and forming a spring retainer;

a second valve means disposed adjacent to said inlet member for providing a unidirectional fluid flow through said passageway in a direction towards said outlet port;

spring means compressively disposed between said armature and said second valve means for urging said armature in a direction towards said outlet port, one end of said spring means circumscribing said bores and being centrally retained thereby and the other end of said spring means holding said second valve means against said inlet member;

solenoid coil means disposed in said housing coaxially around the outside of said guide member for generating a magnetic field operative to move said armature against the force of said spring means in response to a current flow, said solenoid coil means having an input and an output end;

detection coil means disposed in said housing and magnetically linked to said solenoid coil means for generating a first induced signal in response to said solenoid coil means generating an expanding magnetic field and a second induced signal in response to a contracting magnetic field, said detection coil means having one end connected to the output end of said solenoid coil means;

serially connected resistance means and a diode connected between the input end of said solenoid coil means and the other end of said detection coil means for dissipating in a controlled manner the current induced in said solenoid and detection coil means by a contracting magnetic field;

a silicon Darlington amplifier having an emitter terminal connected to the output end of said solenoid coil means, a collector and a base;

a serially connected first resistance and second resistance connected between the other end of said detection coil means and the collector of said Darlington amplifier, said serially connected first and second resistance in series with said solenoid and detection coil means forming a voltage divider;

a third resistance connected between the base of said Darlington amplifier and the junction between said first and second resistances;

an electrical cord having at least two leads, one of said two leads connected to the input end of said solenoid coil means, and the other lead connected to the collector of said Darlington amplifier; and a connector disposed at the opposite end of said cord for connecting said two leads to an electrical outlet receiving electrical power from a source.

12. The portable fluid transfer pump of claim 11 further including means attached to said housing for suspending the fluid transfer pump from a support.

13. The portable fluid transfer pump of claim 11 further including a switch disposed in said housing for controlling the delivery of electrical power to the input end of said solenoid coil means.

14. The portable fluid transfer pump of claim 12 wherein said connector is a connector adapted to be received in the cigarette lighter receptacle of an engine powered vehicle.

15. The portable fluid transfer pump of claim 11 wherein said electrical cord further includes a switch controlling the flow of electrical power through said electrical cord.

16. The portable fluid transfer pump of claim 15 wherein said connector is a connector adapted to be received in the cigarette lighter receptacle of an engine powered vehicle.

* * * * *

UNITED STATES PATENT AND TRADEMARK OFFICE
CERTIFICATE OF CORRECTION

PATENT NO. : 4,101,950
DATED : July 18, 1978
INVENTOR(S) : Donald L. Hager, Ralph V. Brown, James A. Thomas It is certified that error appears in the above-identified patent and that said Letters Patent are hereby corrected as shown below:

Column 5, line 59, after the word "aperture", insert therefor the word ----receiving----.

Signed and Sealed this

Sixteenth Day of January 1979

[SEAL]

Attest:

RUTH C. MASON
Attesting Officer

DONALD W. BANNER
Commissioner of Patents and Trademarks